United States Patent [19]
Shank

[11] Patent Number: 4,571,189
[45] Date of Patent: Feb. 18, 1986

[54] SYSTEM FOR TEACHING COIN RELATIONSHIPS

[76] Inventor: Spencer L. Shank, 551 S. Hobson, Mesa, Ariz. 85204

[21] Appl. No.: 727,598

[22] Filed: Apr. 26, 1985

[51] Int. Cl.$^4$ ............................................. G09B 19/18
[52] U.S. Cl. ......................................... 434/110; 434/195
[58] Field of Search .................... 434/110, 195, 208

[56] References Cited

U.S. PATENT DOCUMENTS

| | | | |
|---|---|---|---|
| 1,836,870 | 12/1931 | Quer | 434/195 |
| 2,502,238 | 3/1950 | Wade et al. | 434/208 |
| 2,950,542 | 8/1960 | Steelman | 434/195 |
| 3,488,864 | 1/1970 | McManus | 434/110 |
| 3,690,017 | 9/1972 | Holmquist | 434/110 |

*Primary Examiner*—William H. Grieb
*Attorney, Agent, or Firm*—James H. Phillips; Charles E. Cates

[57] ABSTRACT

A manipulative system is disclosed which is adapted to teach basic relationships between coins and bills of different denominations and basic change-making skills to students with limited learning capacity. A board overlayed with the images of one hundred coins of the smallest denomination disposed in a five by twenty array is used in conjunction with first and second series of overlays, each having several subsets. The overlays have various quantities of images of the smallest denomination coin imprinted thereon. Some overlays in a first series have a tab carrying the image of a coin equivalent in value to the summation of the coins of the lowest denomination imprinted on a given overlay. The two overlay series have distinctly different background colors to facilitate an understanding of the changemaking process. Under the supervision of an instructor, and sometimes with his participation, a student manually emplaces combinations of overlays on the board to establish the relationships between different coin combinations and the relationships between coins and bills of different denominations and to perfect change-making skills under varying conditions.

12 Claims, 24 Drawing Figures

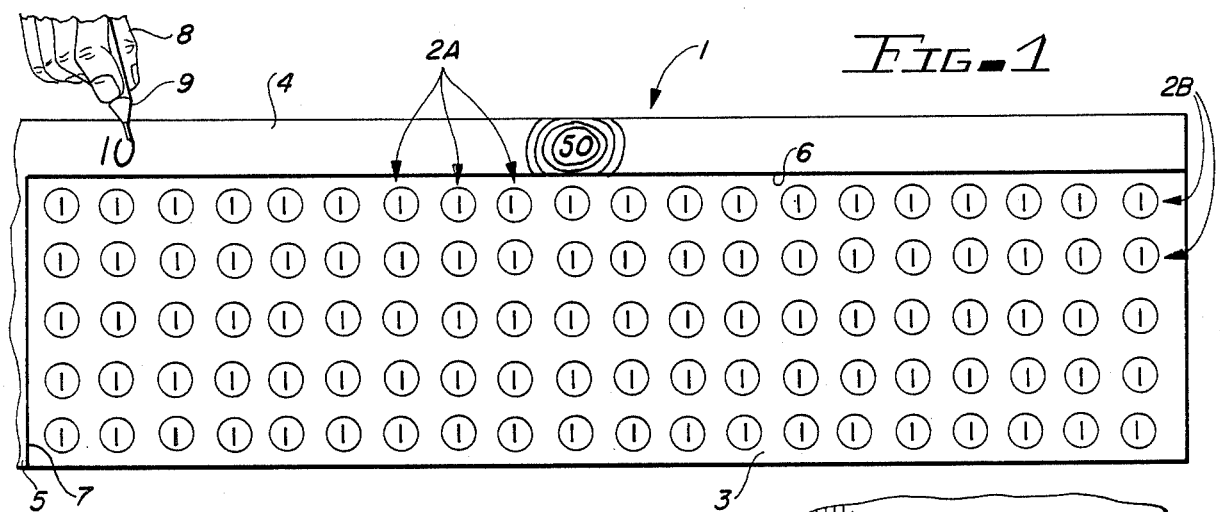
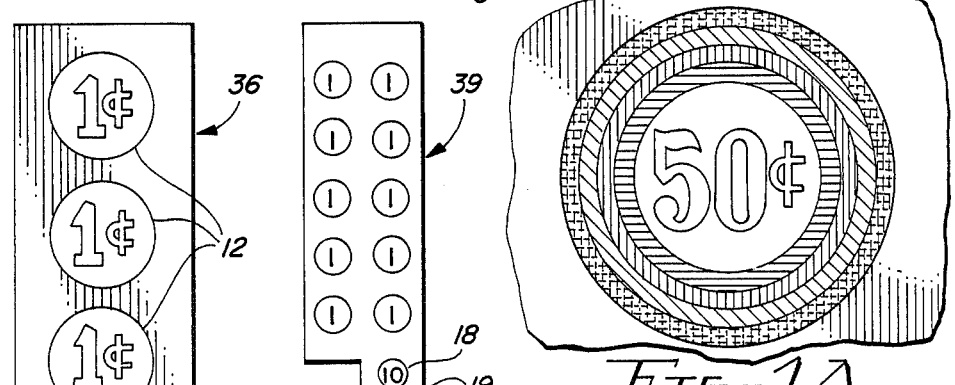
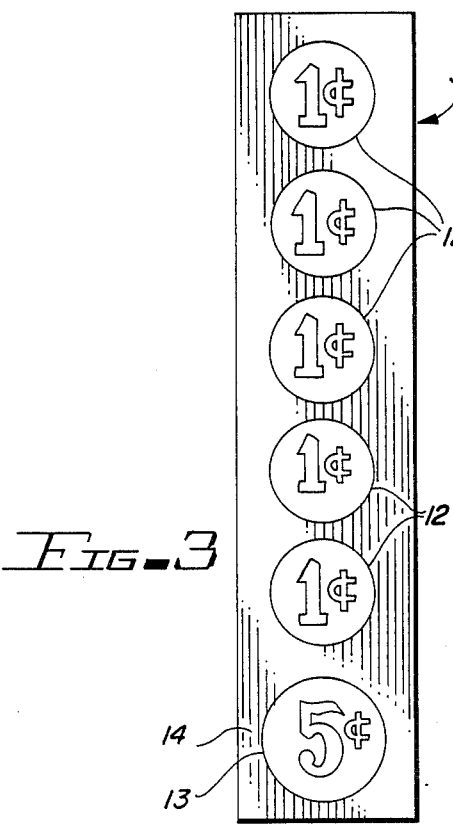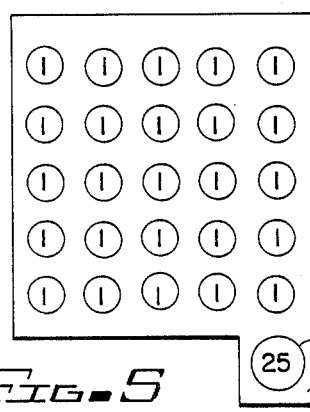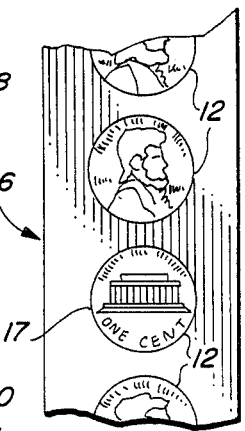
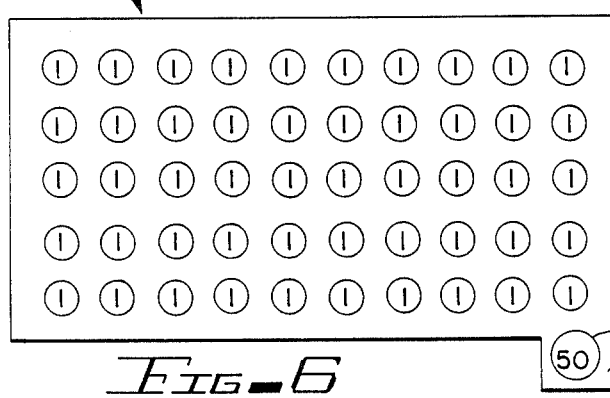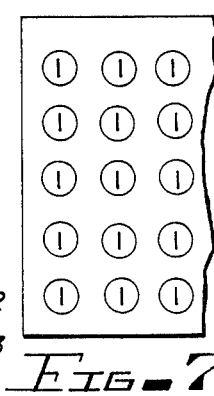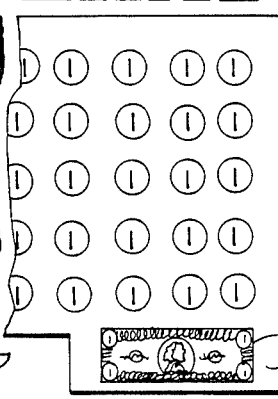

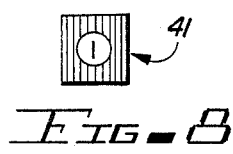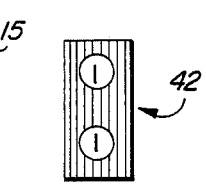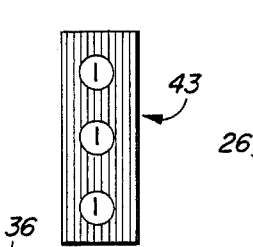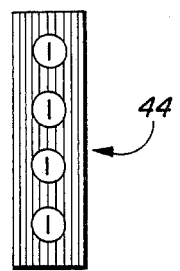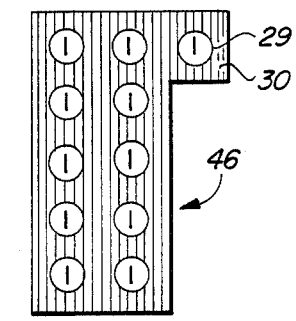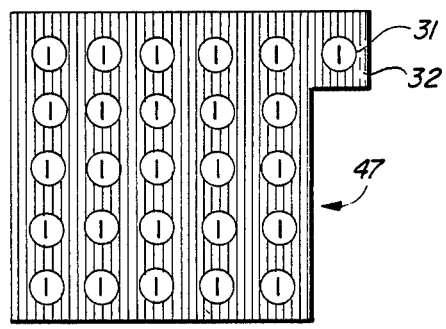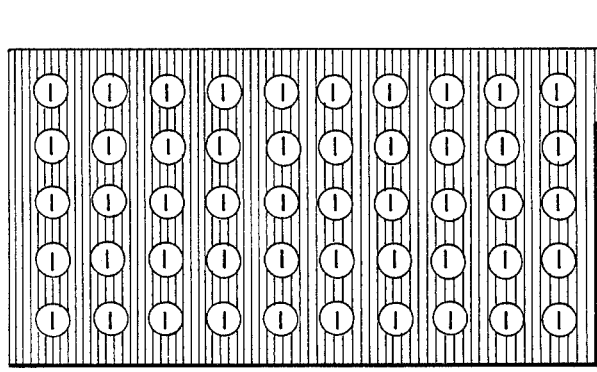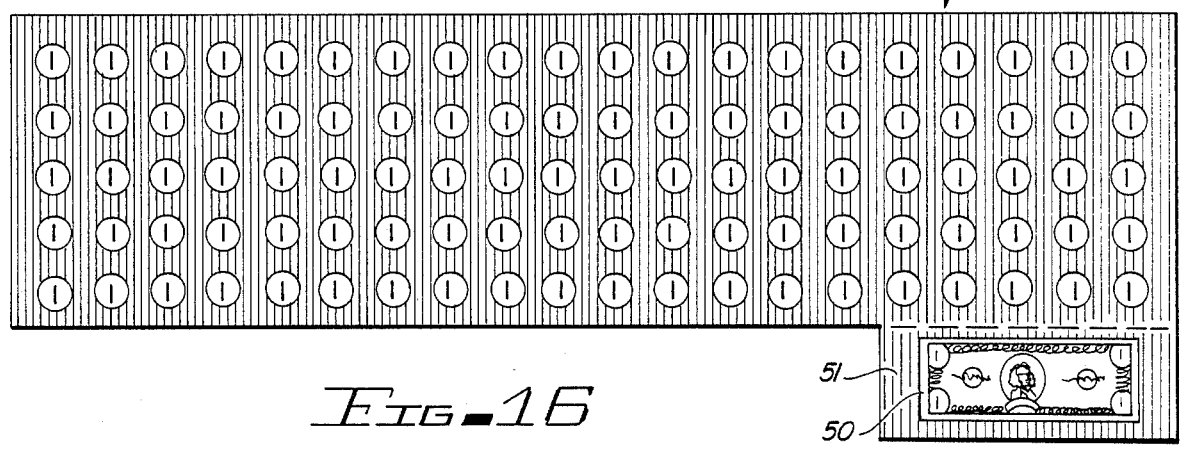

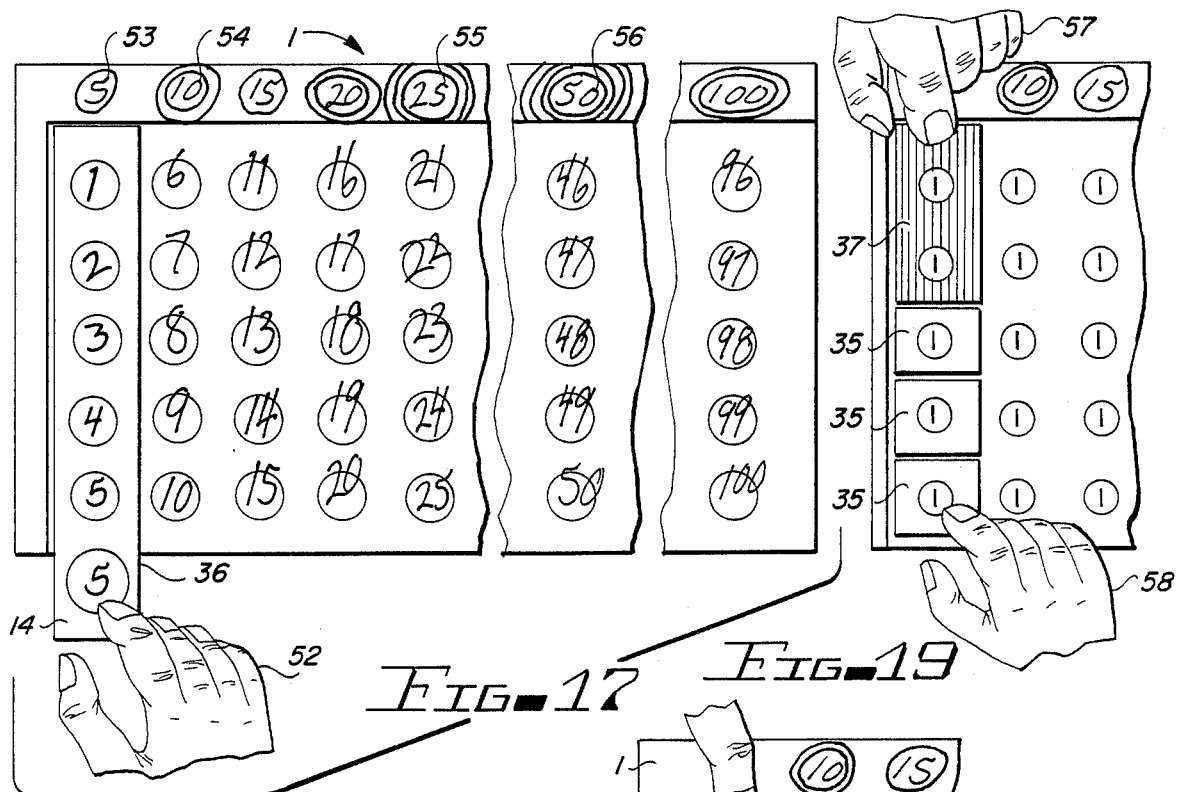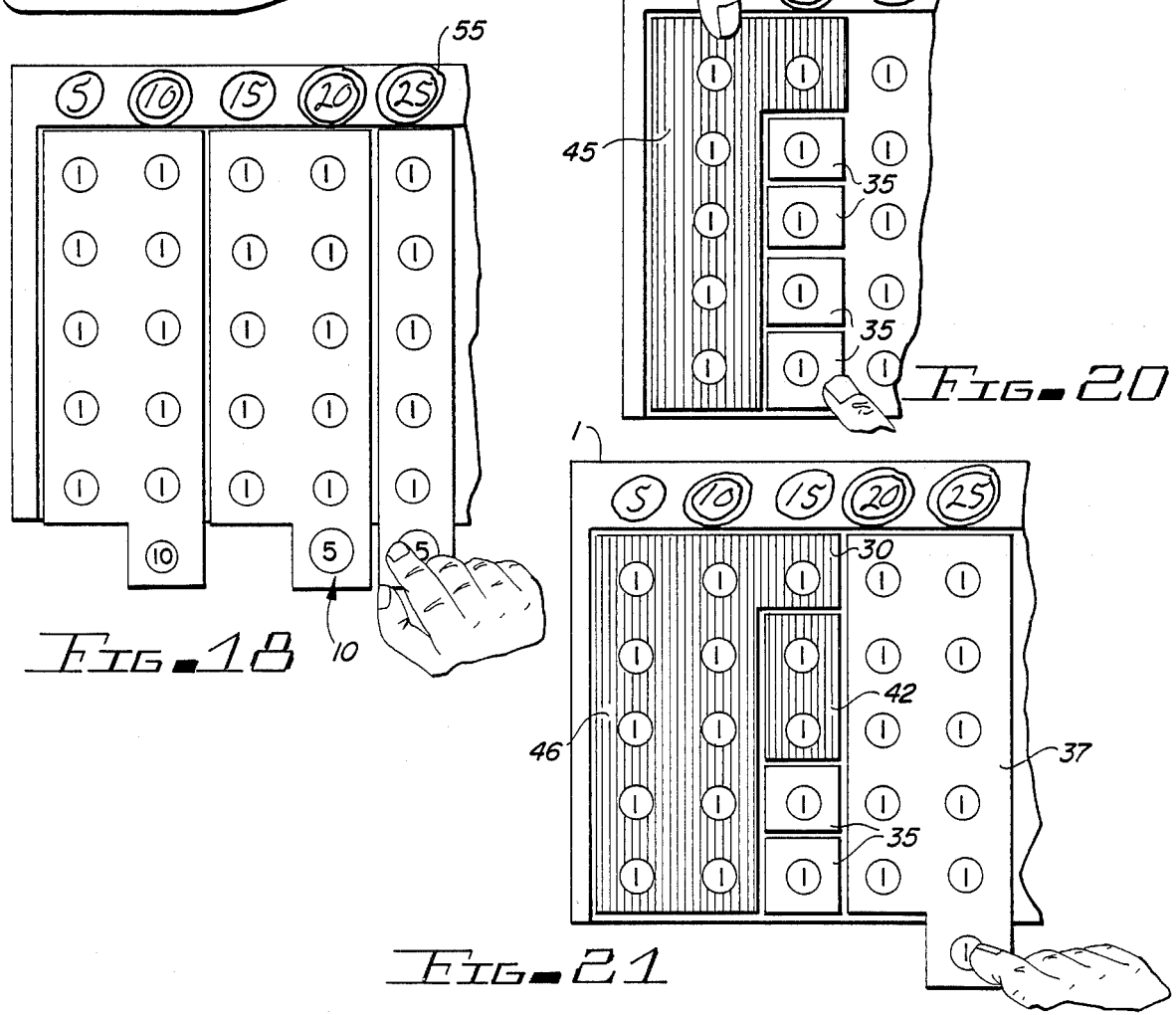

SYSTEM FOR TEACHING COIN RELATIONSHIPS

FIELD OF THE INVENTION

This invention relates to the teaching arts and, more particularly, to the art of teaching the relationship between coins of different values in any monetary system and basic change making skills to students with limited learning ability.

BACKGROUND OF THE INVENTION

One of the most difficult skills to teach children and adults who have limited learning abilities is an understanding of the concept of money and the relationship between different monetary units as well as the closely related skill of change making. However, a facility in the everyday use of coins and bills is a very valuable fundamental skill for such students to acquire in order that they may be functionally integrated into society without systematically being taken advantage of in their everyday money transactions.

In the past, these skills, if taught at all, have been presented somewhat unsystematically. Typically, exemplary transactions have been laboriously repeated in a context which did not take full advantage of diverse, but interrelated, aspects of the individual transactions which can be directed and concentrated to provide the most effective and lasting impression on the mind of the student. These efforts have met with only limited success, perhaps because of the unidimensional character of the teaching approach.

It will therefore be appreciated by those skilled in the art that it would be highly desirable to realize a system for teaching basic money skills to this class of citizens which results in a relatively rapid grasp of the money relationships achieved in such a manner that the system is recallable and available to the student for a lifetime.

OBJECTS OF THE INVENTION

It is therefore a broad object of my invention to provide a system for teaching skills in handling coins and bills to students with limited learning capability.

It is another object of my invention to provide such a system which, once mastered by a student, is recallable, and therefore useful, for a lifetime.

It is a more particular object of my invention to provide such a system which uses to advantage a group of interrelated visual stimuli in conjunction with manual manipulation of system elements representing a relationship between coins and bills.

More specific objects of my invention include the provision of a teaching manipulative by the use of which the following skill competencies are developed by such students:
1. coin identification and comparative coin values;
2. rote counting of both like and unlike value coins;
3. coin equivalencies;
4. different coin combinations which have the same total;
5. change making through $1.00;
6. the extension of skills learned through $1.00 to bill relationships beyond $1.00.

SUMMARY OF THE INVENTION

Briefly, in an exemplary and presently preferred embodiment of my invention, these and other objects are achieved by providing a board imprinted with one hundred images of the smallest denomination coin of a monetary system disposed in an array of columns containing five coins each and rows containing twenty coins each. Two series of several different overlays adapted for manual emplacement and removal on the board are used in a manipulative system in which the student participates alone and with an instructor. The overlays variously include those having a single image of the smallest denomination coin imprinted thereon; those having one or more columns of five images of the smallest denomination coin imprinted thereon and also having a tab on which is imprinted the image of a single coin which represents the cumulative value of the coins on the given overlay; those having a distinctive color background and including at least one but less than five images of the smallest denomination coin imprinted thereon; and those of the same distinctive color background having at least five images of the smallest denomination coin imprinted thereon and one additional column of at least one and less than five images of the smallest denomination coin imprinted thereon. Preferably, the board and overlays have surfaces adapted for easy erasure of marks entered thereon by a grease pencil or the like. The use of the overlays in various combinations emplaced on the board by the student alone or by the instructor and student under the coordination of the instructor results in the secure development of the skills of manipulating and combining coins and bills of different denominations and making change.

DESCRIPTION OF THE DRAWING

The subject matter of the invention is particularly pointed out and distinctly claimed in the concluding portion of the specification. The invention, however, both as to organization and method of use may best be understood by reference to the following detailed description taken in conjunction with the sub-joined claims and with reference to the accompanying drawing of which:

FIG. 1 is a plan view of an exemplary board according to the invention in which United States currency is the exemplary monetary system to be taught;

FIG. 1A illustrates a variant detail of the board shown in FIG. 1;

FIG. 2 illustrates a first overlay for use in conjunction with the board illustrated in FIG. 1 and represents a single coin of the smallest denomination, hence a penny in the exemplary United States system;

FIG. 3 is an overlay containing a single row of penny images and a tab containing a representation of a nickel;

FIG. 3A illustrates how the overlays may be erasably overwritten;

FIG. 3B illustrates a preferred obverse/reverse distribution of the overlays;

FIG. 4 illustrates an overlay containing two rows of five penny images each and an image of a dime situated on a tab;

FIG. 5 illustrates an overlay containing images of five columns of five pennies each and an extension carrying the image of a quarter;

FIG. 6 illustrates an overlay containing ten columns of five penny image each and includes an extension carrying the image of a fifty cent piece;

FIG. 7 illustrates an overlay containing images of one hundred pennies arrayed in twenty columns and five rows and also includes a tab containing a representation of a one dollar bill;

FIG. 8 illustrates an overlay carrying the image of a single penny and shaded to represent a red background;

FIG. 9 illustrates an overlay carrying the images of two columnar disposed pennies on a red background;

FIG. 10 illustrates an overlay carrying the images of three columnar disposed pennies on a red background;

FIG. 11 illustrates an overlay carrying the images of four columnar disposed pennies on a red background;

FIG. 12 illustrates an overlay with red background carrying the images of five pennies in a first column and a single penny in a second column;

FIG. 13 is an illustration of an overlay carrying the images of two columns of pennies and a single penny in a third column;

FIG. 14 is an illustration of an overlay carrying the images of five columns of pennies and a single penny in a sixth column;

FIG. 15 is an illustration of an overlay carrying the images of ten columns of pennies and a single penny in an eleventh column;

FIG. 16 is an illustration of an overlay carrying the images of one hundred pennies disposed in a five by twenty array over a red background and illustrating an optional tab carrying the image of a one dollar bill;

FIG. 17 illustrates a student using the apparatus of the subject invention to determine a simple relationship between the lowest denomination coin and the second lowest denomination coin in the monetary system;

FIG. 18 illustrates the student determining a more complex relationship in which coins of the second and third lowest denominations are combined to achieve the equivalent of a single coin of the fourth lowest denomination;

FIG. 19 illustrates the apparatus of the present invention in which the instructor and student both use the apparatus of the present invention in a very simple change making exercise;

FIG. 20 illustrates a more complex change making exercise; and

FIG. 21 a still more complex change making exercise.

DETAILED DESCRIPTION OF THE INVENTION

In the description of the exemplary embodiment of the invention which follows, the monetary system of the United States is employed. Because the practice of this invention involves the reproduction of the images of coins and bills, preferably fairly accurately both as to size and pattern, it is essential to understand that the laws and regulations pertaining to such reproduction must be strictly followed. In the United States, the pertinent regulations are promulgated by and the pertinent laws enforced by the United States Treasury Department.

Referring now to FIG. 1, there is illustrated a board member 1 which is used in many combinations with overlays which will be discussed below. One hundred pennies are depicted on the board in an array of columns 2A of five coins and rows 2B of twenty coins. The array of penny images is preferably laid out on a surface 3 which is slightly lower than surfaces 4 and 5 on at least the top and left edges. Thus defined are very slight shoulders 6, 7 which, as will become apparent below, assists the student in aligning overlays on the board. I prefer that the entire surface of the board be provided with a smooth surface admitting of erasably writing (with a grease pencil or the like) by the instructor as represented by the hand 8 holding a writing instrument 9.

FIGS. 2-7 depict subsets of a first series of overlays for use with the board 1 shown in FIG. 1. The first series of overlays preferably has a rather neutral background color such as off-white. FIG. 2 illustrates a first overlay 35 for use in conjunction with the board described above and which contains a representation of a penny imprinted on a square, sturdy material. The sides 10, 11 of the overlay are proportioned such that one hundred such one cent overlays could be placed in substantial row and column alignment on the board 1. While the coin image 9 in FIG. 2 is presented with an arabic number "1" followed by a cents sign for ease of depiction, I prefer, as will be discussed in more detail below, to present on the overlays a reasonable facsimile of the appearance, including color, of the coin represented. It has been found that such reasonably correct representation is important in permanently impressing on the mind of the student the relationship between the overlays and the coinage represented.

FIG. 3 illustrates a second overlay 36 which comprises a full column of one-cent piece images 12 and an image of a five-cent piece or nickel 13 aligned below the column of penny images on a tab region 14 of the overlay. Again, the coins on the overlay of FIG. 3 are represented by arabic numerals and cents signs for ease of depiction, but preferably the coin images actually employed are a reasonable facsimile of the actual coins. As shown in FIG. 3A, the overlays, like the board 1 all preferably have surfaces on which the instructor can enter annotations, as by grease pencil or the like, such as indicated by, for example, the numeral two 15 written over the second coin image in the column of pennies represented and the numeral five 16 written over the image 13 of the nickel.

Once again, as particularly shown in FIG. 3B, it is preferred that the pennies 12 on each overlay, as well as all other coins represented, be a reasonable facsimile of the actual coins. Further, it has been found useful to intermix the reverse of the coins, as exemplified by the "tails" representation of the penny image 17, as well as the obverse and to distribute the obverse and reverse images randomly across both the board 1 and the various overlays.

FIG. 4 illustrates another overlay 37 which carries the images of ten pennies disposed in two columns and the image of a ten-cent piece or dime 18 carried on a tab portion 19 disposed beneath the right most column of pennies.

Similarly, FIG. 5 illustrates an overlay 38 carrying the images of twenty-five pennies disposed in five columns of five pennies each and the image of a twenty-five cent piece or quarter 20 disposed on a tab portion 21 aligned beneath the right-most row of pennies.

FIG. 6 illustrates an overlay 39 carrying the images of fifty pennies and a fifty-cent piece 22 on a tab 23; and FIG. 7 illustrates an overlay 40 containing the images of one hundred pennies (the overlay being illustrated partially broken away for ease of depiction) and the image 24 of a one-dollar bill carried on a tab 25.

FIGS. 8-16 inclusive illustrate exemplary subsets of a second series of overlays particularly characterized by the use of a distinctive background color, such as red. FIGS. 8, 9, 10 and 11 depict overlays 41, 42, 43 and 44 which carry, respectively, the images of one, two, three, and four columnar disposed pennies.

FIG. 12 illustrates an overlay 45 which is distinctly different from the previously described overlays in that it carries the images of five pennies 26 disposed in a first column and a sixth penny 27 emplaced on a tab 28 extending to the right of the uppermost penny 26 in the first column. The reason for this arrangement will become evident below.

Similarly, FIG. 13 illustrates an overlay 46 carrying the images of ten pennies disposed in two columns and an eleventh penny 29 situated on a tab 30; FIG. 14 illustrates an overlay 47 carrying the images of twenty-five pennies disposed in five columns and a twenty-sixth penny 31 on a tab 32; and FIG. 15 shows an overlay 48 carrying the images of fifty pennies disposed in ten columns and a fifty-first penny 33 on a tab 34.

It will be appreciated that further variations of the overlays shown in FIGS. 12-15 may include incomplete rightmost columns containing two, three, or four coin images.

Finally, FIG. 16 illustrates an overlay 49 containing the images of one hundred pennies and, optionally, the image of a dollar bill 50 on a tab 51 disposed generally at the lower right hand region of the overlay 49.

The systematic usage of the apparatus described above will manifestly vary somewhat with the teaching philosophy of the individual instructor and with the learning capacity of the student or students in the learning environment. However, experience has shown that certain fundamental techniques should be carefully considered for incorporation by the instructor into the teaching sequence.

Referring, for example, to FIG. 17, the student (represented by the hand 52) is encouraged, by the dimensions of the board 1 and the overlay 36, to emplace the overlay into position in the first column of five pennies to establish the relationship between five pennies and a nickel. If desired, the board portion extending to the right of the first column may be masked off by the instructor to particularly direct the correct emplacement of the overlay by the student. As a further reinforcement of this relationship, the instructor may write the numeral 5 above the first column of penny images at the position 53. A still further enforcement of the relationship may be achieved by encircling the numeral "5" on the tab 14 in a distinctive color such as blue, and similarly encircling the numeral "5" at the position 53. Similarly, the numeral "10" can be entered by the instructor on the board 1 at the position 54 and the image of the dime 18 (FIG. 4) on the tab 19 encircled in red. In addition, the numeral "10" at the position 54 may also be encircled in blue such that the student can become aware that not only will the single red-encoded ten cent overlay fill the board through the "10" position, but also two five-cent blue-encoded overlays will accomplish the same result.

As shown in FIG. 18, as the student progresses, these relationships can be extended to illustrate the several combinations which can fill the board through the "25" position. In FIG. 18, the numeral "25" at the position 55 may be encircled three times in blue, red, and a color (such as green) which represents the single twenty-five cent piece, thus signifying to the student that the last overlay necessary to fill the board to the twenty-five cent position may be any one of the five cent, ten cent, or twenty-five cent overlays. This color code reinforcement procedure can readily be carried out through the fifty cent position choosing, for example, the color yellow to represent the fifty cent piece and encircling the pencilled in "50" indication at the position 56, in all four colors. As shown, for example, in FIG. 1A, it may be preferred by some instructor to have this color-coded relationship permanently imprinted above each column of five pennies across the width of the board 1. Experience has shown that, for many students, care should be taken to avoid color relationships that become too complex, and the instructor should accordingly appropriately limit the extent of the color coding should it become confusing.

Once the student has learned the combinational relationships of the several different denomination coins and of the dollar bill, attention may be directed to learning the more advanced skill of change making. During this procedure, both series of overlays are typically used. A student may first be exposed to a hypothetical transaction in which he purchases some small item the instructor may suggest (such as a piece of gum) which costs less than a nickel and for which he tenders a nickel. As shown in FIG. 19, the instructor, represented by the hand 57 emplaces the overlay 37, representing a two-cent purchase. The distinctive background color indicates vividly to the student that the portion of his nickel is no longer his. The student responds, as represented by the hand 58, by filling out the single column (which he has learned represents a nickel) with three one-cent overlays 30. He therefore learns that his change in this transaction should be three cents.

As the student gains change making skills, he may progress to the transactions illustrated in FIGS. 20 and 21 and beyond. In FIG. 20, a transaction is presented in which a dime has been tendered for a purchase costing six cents, the purchase price being represented by the single "six-cent" overlay 45 with its distinctive color background. The pupil's correct response is to fill in the second column with four single cent overlays 35 to account for the dime he tendered and identify the four cents change to which he is entitled.

In a still more complex transaction depicted in FIG. 21, the student has tendered a quarter for an item costing thirteen cents. The cost of the item is represented by an "eleven-cent" overlay 46 and a supplementary "two-cent" overlay 42 positioned by the instructor in the third column on the board 1 beneath the tab 30. (Alternatively, if available in the set, a single "thirteen-cent" overlay may be used by the instructor.) The student is able to determine the change to which he is entitled by filling in the board 1 through the twenty-five cent position using two one-cent overlays 35 to complete the third column and a ten-cent overlay 37 to complete the fourth and fifth columns. As the student proceeds through systematic exercises, he will learn that the fourth and fifth columns could have been filled with two nickel overlays 36 rather than the dime overlay 37.

It will now be appreciated by those skilled in the art that a very flexible system has been presented for teaching the fundamental skills of coin relationships and change making to students having limited learning capability. It has been found through experience that the skills thus obtained rather readily, according to the capabilities of the student, extend to a system of bills and the relationships between bills of different denominations.

Thus, while the principles of this invention have now been made clear in an illustrative embodiment, there will be immediately obvious to those skilled in the art many modifications of structure, arrangement, proportions, the elements, materials and components used in the practice of the invention, which are particularly adapted for specific applications without departing from those principles.

I claim:

1. A system for teaching the relationships between coins of different values in a monetary system and basic change making skills comprising:
   (A) a board imprinted with one hundred images of the smallest denomination coin of the monetary system disposed in an array of columns containing five coin images and rows containing twenty coin images;
   (B) a first series of overlays adapted for manual emplacement and removal on said board;
      (i) each overlay of a first subset of said first series including at least one column of five images of the smallest denomination coin imprinted thereon and a tab on which is imprinted the image of a single coin which represents the cumulative value of the total number of smallest denomination coin imprinted on said overlay;
      (ii) each overlay of a second subset of said first series of overlays having a single image of the smallest denomination coin imprinted thereon;
   (C) a second series of overlays adapted for manual emplacement and removal on said board, said second series of overlays having a background color disctinctively different from the background color of said first series of overlays;
      (i) each overlay of a first subset of said second series of overlays including at least one column of five images of the smallest denomination coin imprinted thereon; and
      (ii) each overlay of a second subset of said second series of overlays including one column of at least one and less than five images of the smallest denomination coin imprinted thereon.

2. The system of claim 1 which further includes a third subset of said second series of overlays, each overlay of said third subset of said second series of overlays including at least one column of five images of the smallest denomination coin imprinted thereon and one additional column of at least one and less than five images of the smallest denomination coin imprinted thereon.

3. The system of claim 1 which further includes a third subset of said first series of overlays, each overlay of said third subset of said first series of overlays including:
   (A) one hundred images of the smallest denomination coin of the monetary system disposed in an array of columns containing five coin images and rows containing twenty coin images; and
   (B) a tab on which is imprinted the image of a bill which represents the cumulative value of the one hundred coins of the smallest denomination.

4. The system of claim 2 which further includes a third subset of said first series of overlays, each overlay of said third subset of said first series of overlays including:
   (A) one hundred images of the smallest denomination coin of the monetary system disposed in an array of columns containing five coin images and rows containing twenty coin images; and
   (B) a tab on which is imprinted the image of a bill which represents the cumulative value of the one hundred coins of the smallest denomination.

5. The system of claim 4 which further includes a fourth subset of said second series of overlays, each overlay of said fourth subset of said second series of overlays including one hundred images of the smallest denomination coin of the monetary system disposed in an array of columns containing five coins and rows containing twenty coins.

6. The system of claim 5 in which each overlay of said fourth subset of said second series of overlays further includes a tab on which is imprinted the image of a bill which represents the cumulative value of the one hundred coins of the smallest denomination.

7. The system of claim 1 in which said board and said overlays have surfaces adapted for easy erasure of marks entered thereon by a grease pencil or the like.

8. The system of claim 2 in which said board and said overlays have surfaces adapted for easy erasure of marks entered thereon by a grease pencil or the like.

9. The system of claim 3 in which said board and said overlays have surfaces adapted for easy erasure of marks entered thereon by a grease pencil or the like.

10. The system of claim 4 in which said board and said overlays have surfaces adapted for easy erasure of marks entered thereon by a grease pencil or the like.

11. The system of claim 5 in which said board and said overlays have surfaces adapted for easy erasure of marks entered thereon by a grease pencil or the like.

12. The system of claim 6 in which said board and said overlays have a surface adapted for easy erasure of marks entered thereon by a grease pencil or the like.

* * * * *